(12) United States Patent
Ylikoski et al.

(10) Patent No.: US 7,644,267 B2
(45) Date of Patent: Jan. 5, 2010

(54) CONTROLLING ACCESS TO SERVICES IN A COMMUNICATIONS SYSTEM

(75) Inventors: Martti Ylikoski, Helsinki (FI); Tahvo Hyotylainen, Tampere (FI); Timo Virtanen, Casal Palocco (IT); Artuu Laine, Lappeenranta (FI); Terho Kiiskinen, Tampere (FI); Jukka Aakula, Helsinki (FI)

(73) Assignee: Nokia Corporation, Espoo (FI)

( * ) Notice: Subject to any disclaimer, the term of this patent is extended or adjusted under 35 U.S.C. 154(b) by 852 days.

(21) Appl. No.: 10/879,585

(22) Filed: Jun. 30, 2004

(65) Prior Publication Data

US 2005/0228985 A1 Oct. 13, 2005

(30) Foreign Application Priority Data

Mar. 31, 2004 (FR) .................................. 20040475

(51) Int. Cl.
*H04L 29/06* (2006.01)
(52) U.S. Cl. ...................... 713/153; 455/405; 455/406; 455/503; 709/224; 379/111
(58) Field of Classification Search .................. 713/153
See application file for complete search history.

(56) References Cited

U.S. PATENT DOCUMENTS 7,024,209 B1 * 4/2006 Gress et al. ................. 455/466
7,228,427 B2 * 6/2007 Fransdonk ................... 713/176
7,231,416 B1 * 6/2007 Busuioc ....................... 709/202
2002/0133545 A1 * 9/2002 Fano et al. ................... 709/203
2002/0199182 A1 12/2002 Whitehead
2003/0120583 A1 6/2003 Olson et al.
2003/0212991 A1 11/2003 Mahajan

FOREIGN PATENT DOCUMENTS

WO WO 03/044615 A2 5/2003

* cited by examiner

*Primary Examiner*—Emmanuel L Moise
*Assistant Examiner*—Shewaye Gelagay
(74) *Attorney, Agent, or Firm*—Harrington & Smith, PC

(57) ABSTRACT

A proxy network element for controlling access to services in a communications system is disclosed. The proxy network element is configured to communicate with at least one further network element using a protocol belonging to a plurality of protocols, the at least one further network element controlling service usage based on service subscriptions. The proxy network element is also configured to provide access for the at least one further network element to at least one information store storing information relating to service subscriptions. The proxy network element provides support for communicating using the plurality of protocols and support for accessing a plurality of different information stores.

28 Claims, 7 Drawing Sheets

CONTROLLING ACCESS TO SERVICES IN A COMMUNICATIONS SYSTEM

BACKGROUND OF THE INVENTION

1. Field of the Invention

The present invention relates to controlling access to services in a communications system.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for communications devices, including various user equipment, are known. An example of the wireless systems is the public land mobile network (PLMN). Another example is the wireless local area network (WLAN).

A PLMN is typically a cellular system wherein a base transceiver station (BTS) or similar access entity serves user equipment (UE) such as mobile stations (MS) via a wireless interface between these entities. The operation of the apparatus required for the communication can be controlled by one or several control entities. The various control entities may be interconnected. One or more gateway nodes may also be provided for connecting the cellular network to other networks, such as to another cellular system or to a public switched telephone network (PSTN) and/or other communication networks such as an IP (Internet Protocol) and/or other packet switched data networks.

A cellular network, as an example of a communication system, may thus provide a number of communications services for a user. Furthermore the cellular network may provide access to various services and applications provided by the cellular network or by entities or networks external to the cellular network. These various services and application are often called content services. In the following description the term service generally refers to content services.

For controlling access to services, a communications system typically maintains information about service subscriptions. Only users having a service subscription may be allowed to access some services. Typically the service subscription information is maintained in a database or in a directory, and there is a subscription server managing the service subscriptions and service provisioning. Service provisioning refers here to configuring various network elements so that the user is provided with the access to the service he has subscribed to. Information about user subscribing a new service may be input manually to the subscription server by a person handling subscription information. Alternatively, the subscription server may be equipped with an interface for receiving subscription information from a further server which a user may access, for example, by browsing the Internet.

Access to some services may be controlled simply by service provisioning. In this case, when the relevant network elements have been configured properly, the user can access the service and otherwise he cannot access the service. In some cases, however, a user's access to a service is not dependent on configuring network element. In this case there may be need to monitor the user's service usage on-line, for example, for controlling the service usage or for charging purposes.

FIG. 1 shows schematically an example of a communications system 100, a communication device 10 of a user and also a server 120 external to the communications system. In the example shown in FIG. 1, the user of the communications device 10 is accessing a service provided by the server 120. The communication system 100 has a Customer Care and Billing (CCB) system 110 and an information store 112 for service subscription information. FIG. 1 shows further a network element 114 for monitoring the user's service usage. The communications system operator may, for example, wish to charge the user differently for browsing the Internet or for accessing his emails from a mail server. The network element 114 may monitor, for example, the protocol headers of the data packets transmitted to the communication device 10 for determining the type of content of the data packets. For simply monitoring, the network element 114 may not need access to the subscription information. But if the network element 114 is controlling the users' access to services based on subscription information, the network element 114 needs to have access to the subscription information in the information store 112.

Typically a network operator of a communications system has a customer care and billing system with an information store for subscription information. If the network operator wishes to add to the communications system further network elements for controlling users' service usage, the customer care and billing system typically needs to be modified for providing access to the subscription information. Different network operators may have different customer care and billing systems, and the network elements for controlling service usage may be provided by different vendors. The customer care and billing system typically uses certain protocols, which may be even proprietary protocols of the network operator. Therefore at least protocol translation needs to be done for providing access to the customer care and billing system for the network element controlling service usage. Traditionally a lot of resources have been invested in making a specific customer care and billing system and network elements needing access to the customer care and billing information interoperable.

Alternatively, it is possible that a further information store is used for storing information relating to services provided by servers or network elements external to the communication system of the network operator. One reason for this is that a network operator may be reluctant to give access to the customer care and billing system for any network elements. A further reason may be that the customer care and billing system does not store information needed for controlling service usage. Additionally, a customer care and billing system may not be able to respond as often as is needed to on-line queries made by network elements controlling service usage.

There are thus a number of problems in providing a solution for controlling users' service usage. Typically it is expected that a solution involves a considerable amount of integration work.

One of the aims of the present invention is provide a feasible solution to the problem of controlling users' service usage.

SUMMARY OF THE INVENTION

A first aspect of the present invention relates to a proxy network element for controlling access to services in a communications system, said proxy network element configured to communicate with at least one further network element using a protocol belonging to a plurality of protocols, said at least one further network element controlling service usage based on service subscriptions, and provide access for said at least one further network element to at least one information store storing information relating to service subscriptions, said proxy network element providing support for communicating using said plurality of protocols and support for accessing a plurality of different information stores.

A second aspect of the present invention relates to a system for controlling access to services in a communications system, said system comprising at least one information store for storing information relating to service subscriptions, at least one first network element for controlling service usage based on service subscriptions, a first network element using a protocol of a plurality of first protocols for communicating information relating to the service subscriptions, and a proxy network element configured to communicate with said at least one first network element using a protocol belonging to a plurality of protocols and to provide access for said at least one first network element to said at least one information store, said proxy network element providing support for communicating using said plurality of protocols and support for accessing a plurality of different information stores.

A third aspect of the present invention relates to a system for controlling access to services in a communications system, said system comprising at least one information store for storing information relating to service subscriptions, a first network element for managing said information relating to service subscriptions, said first network element configured to store and access information in said at least one information store, at least one second network element for controlling service usage based on service subscriptions, and a proxy network element configured to provide access for said at least one second network element to said at least one information store and to send to the first network element information relating to a new service subscription for making the new service subscription.

A fourth aspect of the present invention relates to a proxy network element for controlling access to services in a communications system, said proxy network element configured to provide access for at least one first network element to at least one information store, said at least one first network element controlling service usage based on service subscriptions, and send to a second network element information relating to a new service subscription for making the new service subscription, said second network element managing said information relating to service subscriptions and storing information in at least one of said at least one information store.

A fifth aspect of the present invention relates to a method for processing a request in a proxy network element, said method comprising receiving a request in accordance with a protocol using a respective protocol specific module, said request relating to service usage and being received from a further network element responsible for controlling service usage, said protocol specific module belonging to a plurality of protocol specific modules provided in said network element, converting said request into a unified request, and processing said unified request.

A sixth aspect of the present invention relates to a method for controlling access to services in a communication network, said method comprising receiving a request relating to service usage from a first network element responsible for controlling service usage, detecting a need for a new service subscription relating to said request, and sending information relating to the new service subscription to a second network element responsible for managing service subscriptions.

In accordance with another embodiment of the invention, a computer program embodied on a computer-readable medium, is provided. The computer program is configured to control a processor to perform communicating with at least one further network element using a protocol belonging to a plurality of protocols. The at least one further network element controlling service usage based on service subscription. The computer program is configured to control a processor to perform providing access for the at least one further network element to at least one information store storing information relating to service subscription. The proxy network element providing support for communicating using the plurality of protocols and support for accessing a plurality of different information stores.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The terms service usage and access to services in this description and in the appended claims refer mainly to content services. As mentioned above, a network element controlling service usage may identify the content service, for example, based on a network address, protocol, and/or destination URL (Uniform Resource Locator). Some examples of content services are browsing (typically using Hypertext Transfer Protocol HTTP), electronic mail (specific protocols for communications between an email client and an email server), and services providing specific content like news services. News services and other specific content services are typically identified by URLs.

When the use of certain content services is controlled or monitored by a network operator providing mobile communications services, a user wishing to use these content services with a mobile station typically needs to have a service subscription to these content services with the network operator. It is appreciated that for accessing and using, for example, certain news services a user typically needs to have a subscription also with the news service provider. Subscriptions with content service providers are, however, not discussed further in this description.

Figure 1:
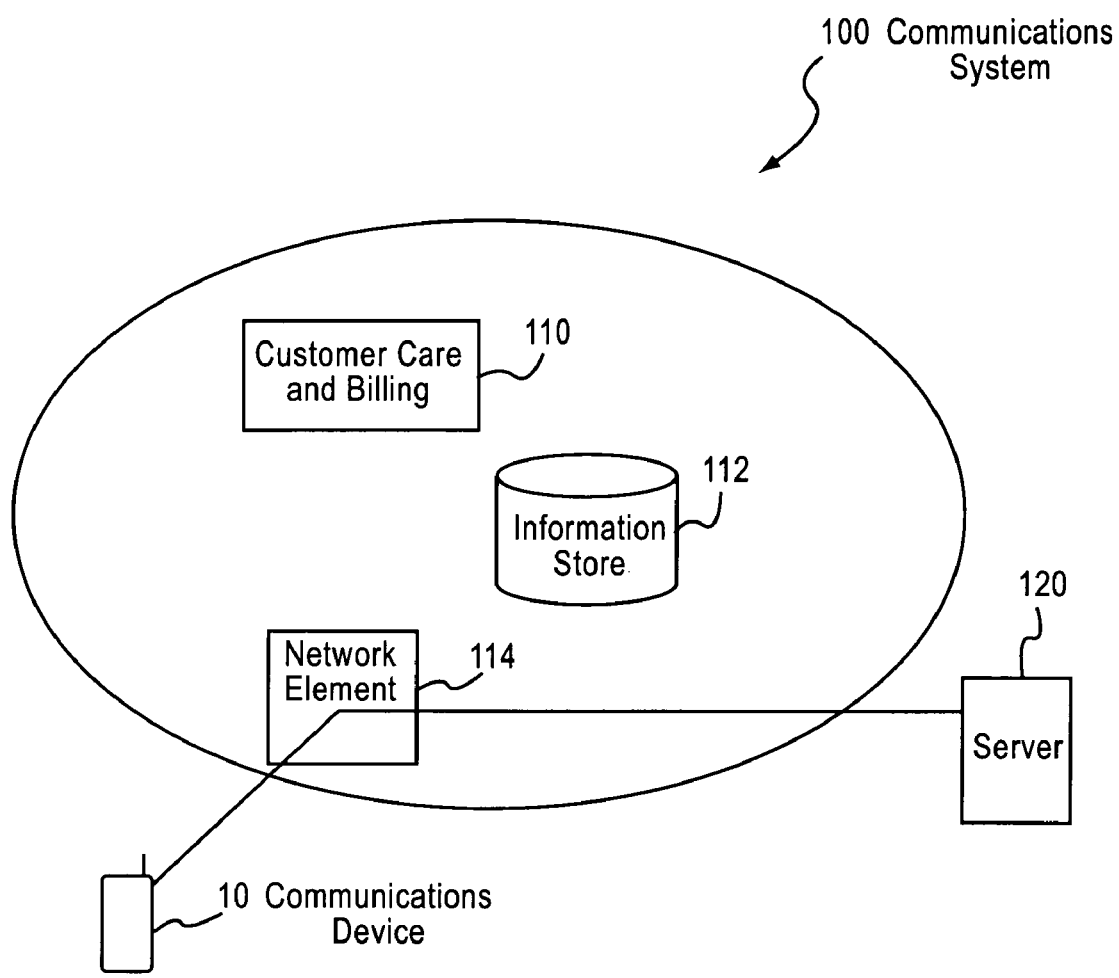
FIG. 1 shows schematically a communication system with a network element for monitoring users' service usage.
Figure 2:
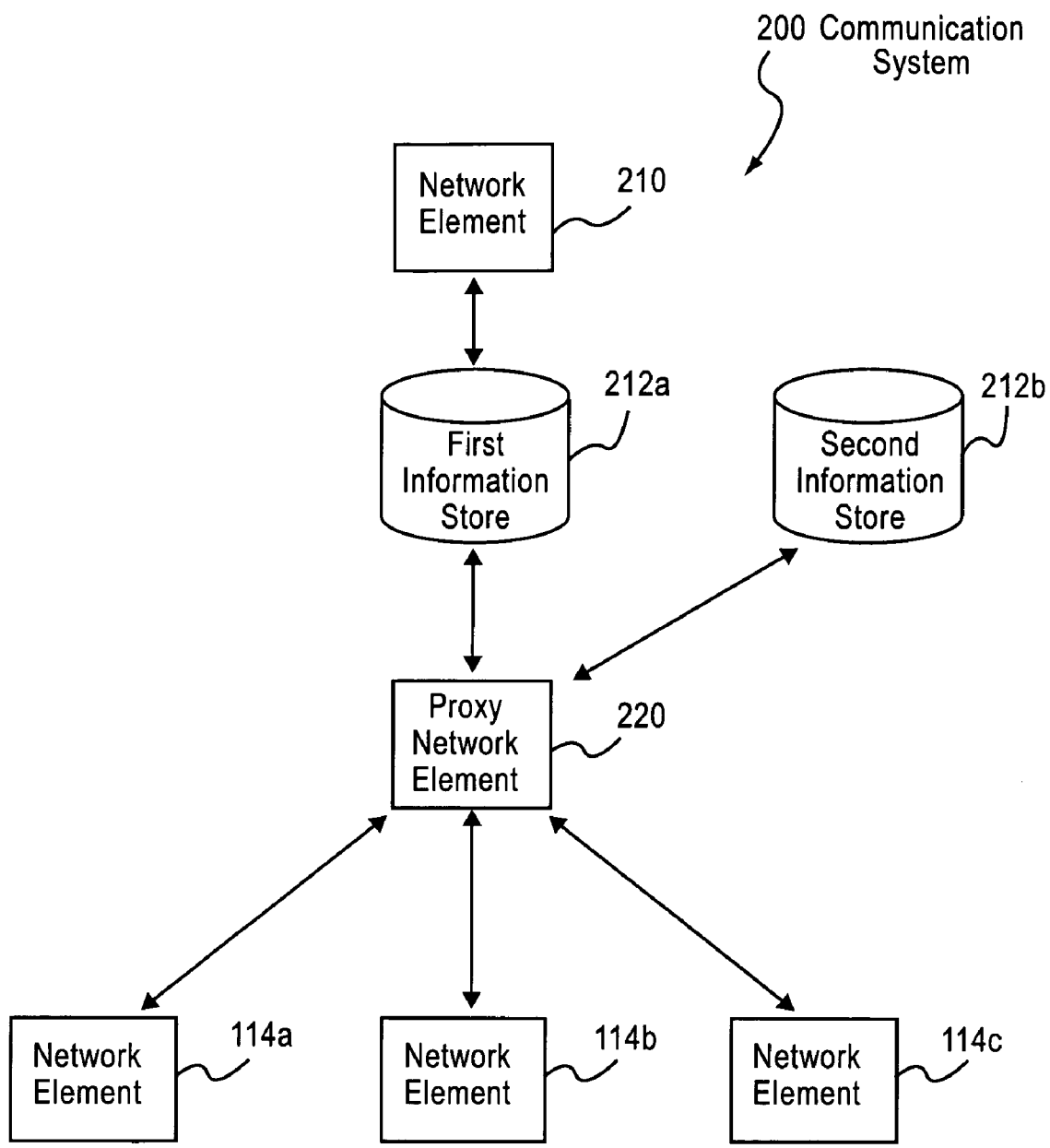
FIG. 2 shows schematically a proxy network element in accordance with an embodiment of the invention in a communications system.

FIG. 2 shows schematically a proxy network element 220 in accordance with an embodiment of the invention in a communications system 200. The communications system may be, for example, a cellular communications system having a radio access network comprising base stations and base station controllers for controlling radio resources. FIG. 2 shows only those network elements, which are relevant for understanding the present invention.

The communication system 200 has a network element 210 for managing subscription information. This network element 210 may be, for example, a part of a customer care and billing system. Alternatively, it may be a network element managing subscription information relating to services provided by servers external to the communication system 200. The communication system 200 also has, as an example, two information stores 212a, 212b for storing subscription information. It is possible that the first information store 212a contains information relating to the same users as the second information store 212b, but the pieces of user information or subscription information contained in these information stores are different. For example, the information store 212a may contain information relating to the services provided by the communications system 200 and the second information store 212b may contain information relating to services provided by servers external to the communications system 200. It is possible that the communication system 200 contains only one information store or more than two information stores.

An information store may be a directory employing a certain protocol for accessing and modifying the information stored in the directory. One example is a directory employing the Lightweight Directory Access Protocol (LDAP). An information store may alternatively be a relational database, for example, an Oracle database or a DB/2 database. Further examples of information stores are proprietary information stores. There are also emerging standards for information stores, examples of which are Liberty, 3GPP GUP (Third Generation Partnership Project Generic User Profile), and SOAP/XML (Simple Object Access Protocol/Extensible Markup Language)

The communication system 200 contains a plurality of network elements 114a, 114b, 114c for monitoring and controlling service usage. These network elements 114 need to have access to at least one of the information stores 212a, 212b storing subscription information. A network element 114 for monitoring and controlling service usage typically has the following functionality. The network element 114 gets the end user's (subscriber's) identity from the network (in other words, from other network elements). In addition, the network element 114 monitors end user's traffic and thus knows, which service the end user is currently using. It needs to retrieve end user's subscription information for that particular service from one or multiple of data stores 212a, 212b. The subscription information defines, how the network element 114 should monitor and control the end user's traffic. Different monitoring options can be, for example, count transmitted or received bytes, measure connection or session time, count only certain URLs or web pages accessed and report the measurements either to a file or to another network element. Controlling options can be, for example, allowing unlimited access, denying access, asking from another network element, how much traffic is allowed, redirecting traffic to another destination, or assuring certain QoS (Quality of Service). There are many common standards specifying how network elements monitoring and controlling service usage interact with each other and retrieve the user and subscription information. The following are some examples of such standards: LDAP, Radius, Diameter, Corba and SOAP/XML.

It is appreciated that in the following description and in the appended claims a reference to a network element controlling service usage means a network element controlling and/or monitoring service usage.

The proxy network element 220 provides connectivity between the network elements 114 and the information stores 212. As there are many possible protocols a network element 114 can use, the proxy network element 220 provides support for a plurality of protocols for communications between the network elements 114 and the proxy network element 220. Furthermore, as the information stores may be of different types, the proxy network element 220 provides support for accessing a plurality of different information stores.

A proxy network element 220 enables use of existing infrastructure for managing subscriptions and information about subscriptions. If the existing information stores have the needed data, the proxy 220 enables service usage controlling network elements to connect to the information stores. The proxy 220 thus saves the network operators duplicate investments into the system infrastructure for managing subscriptions.

Figure 3:
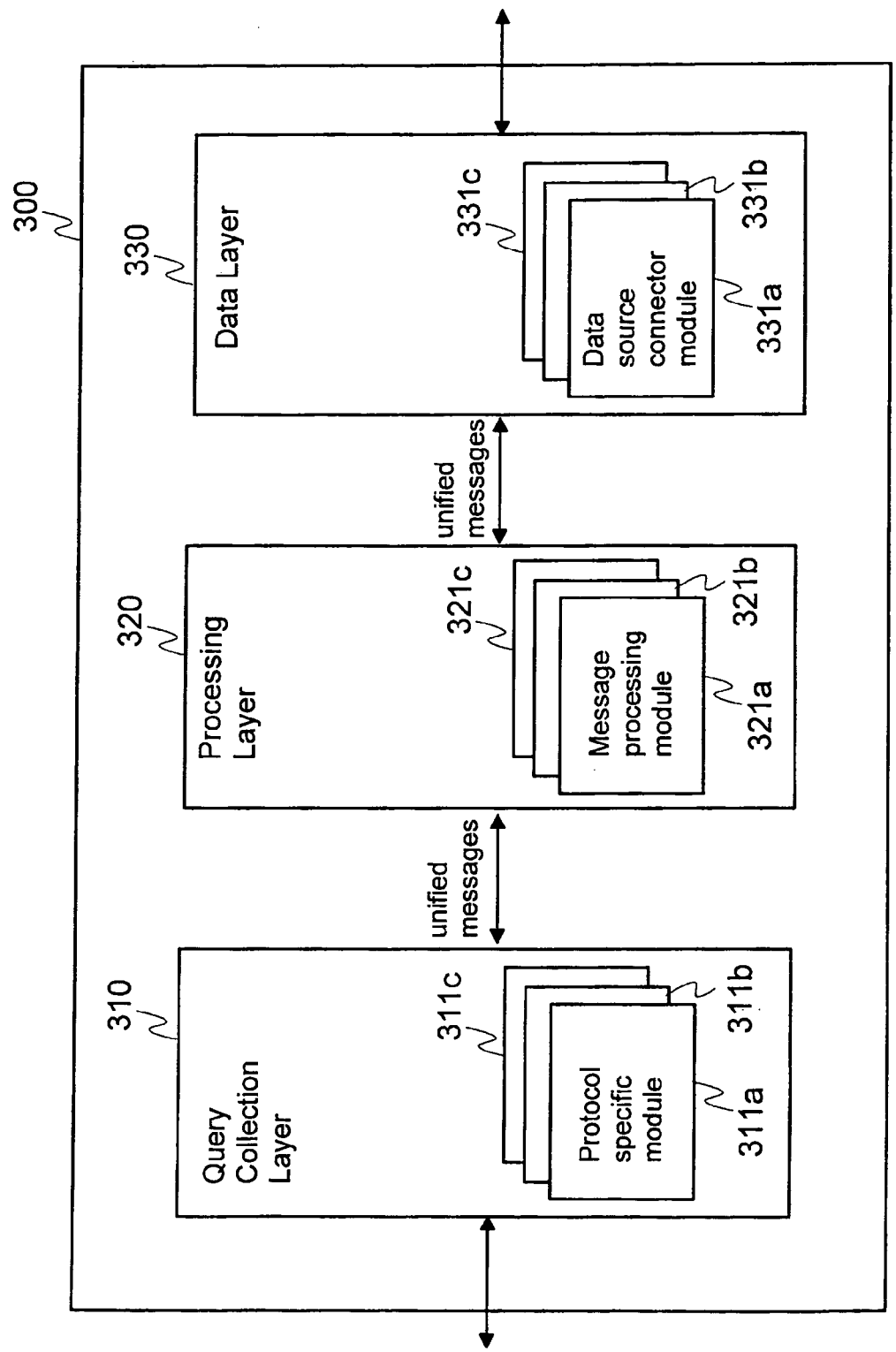
FIG. 3 shows schematically details of the proxy network element.

FIG. 3 shows schematically details of one implementation of the proxy network element 300. The proxy 300 provides support for a plurality of protocols for communicating with network elements 114 controlling access to services. In FIG. 3, this is shown as a query collection layer 310 including a set of protocol specific modules 311 which listen for incoming queries from the network elements 114. In addition, the protocol specific modules 311 are responsible for sending the response back to network elements 114 using the network element specific protocol. To process the queries from the network elements 114, the proxy 300 translates the requests into unified requests used inside the proxy 300. Typically the protocol specific modules 311 are responsible for this translation into unified requests. The processing layer 320 is responsible for processing the unified messages. The processing layer 320 typically includes a set of processing modules 321, as shown in FIG. 3. In the processing layer 320 it is determined based on easily modifiable configuration which information needs to be fetched and from which information stores. For fetching information from information stores, the proxy 300 has different a data layer 330 including data source connector modules 331.

It is appreciated that a unified message in this description and in the appended claims refers to a set of predefined attributes or other predefined message components. There may be defined a set of predefined message structures. A message structure here refers to a predefined set of attributes or other message components. Typically each predefined message structure has a respective identifier, and this message identifier may be used for determining how to process the unified message. For example, unified message could be a hash table, where keys and values are:

| PROTOCOL RADIUS | |
|---|---|
| NE | GGSN |
| TYPE | PROFILE_QUERY |
| user_id | foo@bar.com |
| IMSI | 3294537457324532 |
| MSISDN | +358501231234 |

-continued

| PROTOCOL RADIUS | |
|---|---|
| source_ip | 141.192.76.13 |
| URL | wap://wap.bar.com/foo/song.mp3 |
| timestamp | 20040311114543 |

In the beginning profile of query process a hash table could, for example, include only first four attributes. The rest of the attributes are added in the processing layer 320. The processing layer 320 may determine the subscriber identity IMSI (International Mobile Subscriber Identity) and the phone number MSISDN (Mobile Subscriber Integrated Services Digital Network) based on the original user identity information user_id, by accessing an information store containing information about the correspondence of the user identities and the subscriber identities.

The proxy 300 thus provides the protocol driver support for various protocols the network elements 114 may use. In addition the proxy 300 provides the ability to program the translation business logic. Translation business logic consists of modules each capable of doing dedicated operations. Each module's operation can be further specified with the configuration of proxy 300. The proxy 300 also has mechanism for adding new protocol specific modules 311, new processing modules 321 and/or new data source connector modules 331 to the process of connecting clients to data sources. If a needed protocol specific module (query collector module), processing module or data source connector module is not yet available, the proxy 300 has a well defined API (Application Programming Interface), which makes it possible to implement the needed module. Such modules can be added to the proxy 300 without affecting the existing modules and without need to recompile the proxy 300.

Figure 4:
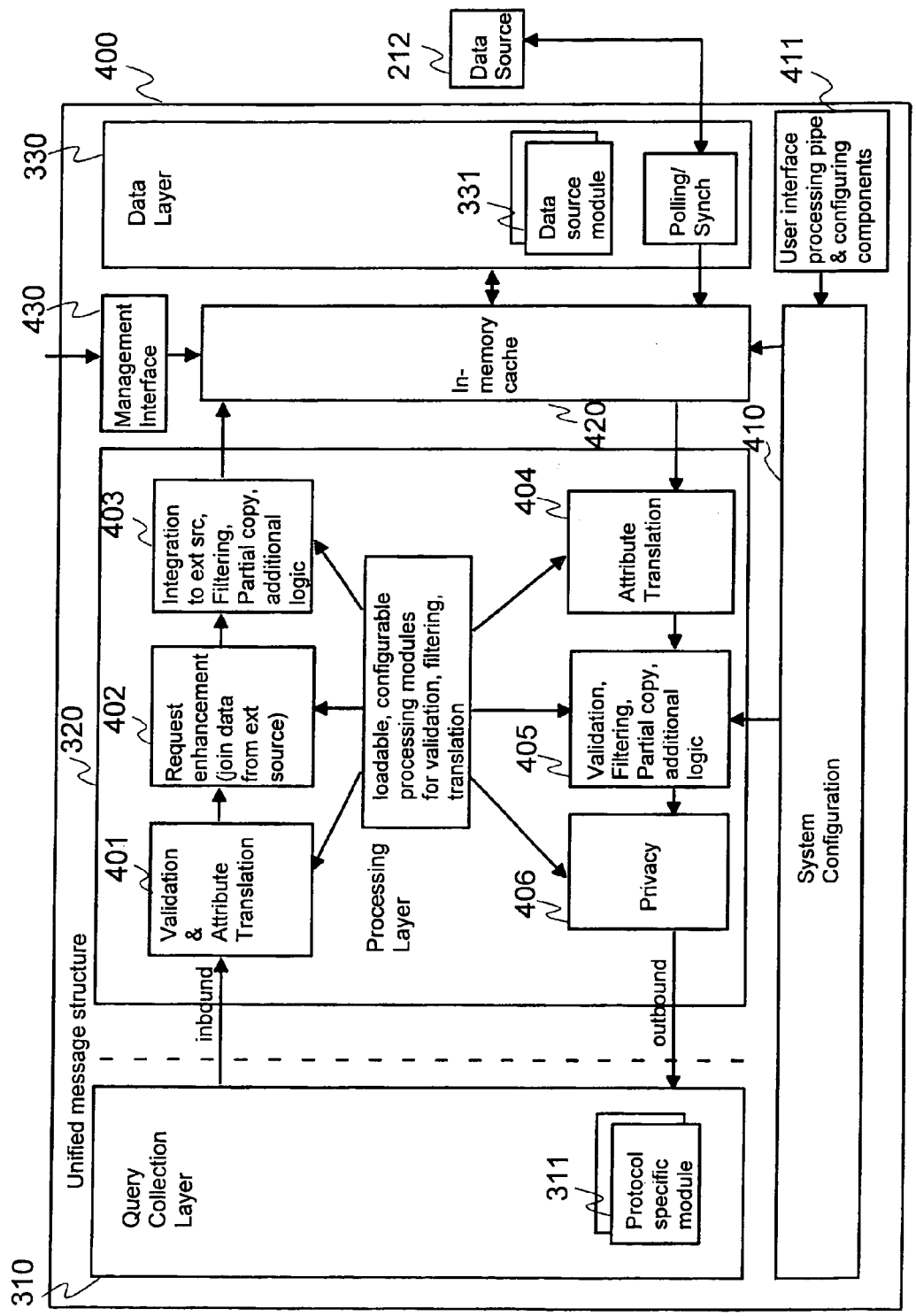
FIG. 4 shows schematically further details of the proxy network element.

FIG. 4 shows schematically further details of a proxy network element 400. The proxy 400 has a modular architecture that allows for adding, modifying and deleting processing modules during the request processing. These modules allow for joining of data from multiple information stores, and thus they create a truly powerful virtual data store. Subscription information can be stored in a plurality of information stores in a flexible way, and the proxy 400 determines which data to fetch and from which information store.

To process the queries/requests from the network elements 114, the proxy 400 has a plurality of processing modules 321 for processing requests. When a specific request is received, the proper processing modules 321 for processing the request can be selected based on the received request. Typically the received request is first translated into a unified request, and then the modules for processing the unified request are selected. The request is then processed in a pipeline processing manner using the set of processing modules, the processing modules sequentially following each other.

The following are some examples of processing modules for processing request. A request validation processing module 401 checks that the request contains necessary information for providing a response. An attribute translation processing module, which is in FIG. 4 shown to be part of the same processing module 401 as the request validation processing module, translates attributes in the original request into attributes used in processing requests in the proxy 400. For example, names of the attributes and the types of the attributes may need to be changed or a new attribute may need to be constructed based on other attributes. A request enhancement processing module 402 is responsible for fetching information, which is relevant for processing the original request but was not present in the original request. For example, the request enhancement processing module 402 may fetch a telephone number used in a specific information store based on a user identity present in the original request. As a further example, it is possible that a subscriber identity relating to the original user identity needs to be fetched from a first information store and then the telephone number is fetched from a second information store using the subscriber identity fetched from the first information store. A request filtering processing module 403 is responsible for filtering before information is fetched from the information stores. For example, it is possible that certain requests are treated as notifications and no response will be provided. As a further example, it is possible that in certain situations a standard response is sent. This may be applicable, for example, to prepaid subscriptions. FIG. 4 shows also a copying processing module. The copying processing module is responsible sending a complete copy or a partial copy of the request to a further network element or to a further process, for example, to a fraud detection system. Furthermore, as FIG. 4 shows, it is possible to provide a number of additional logic modules.

Similarly, the proxy 400 contains a plurality of processing modules for processing unified responses before converting them into responses to be sent to the network elements 114 controlling service usage. The conversion from a unified message into a protocol message to be sent to the network element 114 takes place in the query collection layer 310, typically in the specific protocol module. A set of processing modules from the plurality of processing modules may be selected based on the unified response to be processed. FIG. 4 shows some examples of processing modules for processing responses. An attribute translation processing module 404 translates, where necessary, attributes of the unified message into attributes to be sent to the network element 114. The processing component 405 performs similar tasks as the processing component 403, namely validation, filtering and/or sending copies of the message. The privacy processing component 406 may be used, for example, for encrypting some information in the message. It is appreciated that same processing modules may be applicable for processing unified requests and unified responses.

The response sent from a proxy network element back to the network element controlling service usage typically contains subscription information indicating details for monitoring and/or controlling the user's service usage.

The processing modules for processing the unified requests and responses may be configurable. The processing modules for processing the unified requests and responses may also be loadable. Proxy 400 has a system configuration 410 specifying, which protocols are supported and how different queries are processed i.e. what processing modules are used and in which order. Only processing modules that are needed and specified in the configuration, are loaded. For each processing module, the system configuration 410 can specify further, how that processing module processes the query. Thus the same processing module can behave in a different way while processing different types of queries. For example, for query types A and D a filtering processing module can filter out prepaid subscribers, for query type B it can filter out postpaid subscribers, and for query type C it can filter out both prepaid and postpaid subscribers. This increases the reusability of processing modules, and makes it easier for the proxy 400 to adapt to different processing needs.

The system configuration part 410 shows in FIG. 4 is discussed in detail above. There may also be a user interface 411 or other interface for specifying processing pipelines and configuring modules. As seen in previous paragraph, the system configuration is the soul of the proxy 400 as the system configuration specifies, how the proxy 400 behaves. To ease the configuring, a graphical user interface may be useful.

FIG. 4 also shows a cache memory 420 for storing a cached copy of the subscription information originally fetched from information stores 212. This means that it is possible to first check whether information to be fetched from one of the information stores is already present in the cache memory. The cache memory thus off-loads query load from the information stores and provides better performance.

In-memory cache 420 allows for clients to store real-time session information to the proxy. A session can be, for example, a PDP context in GPRS network. The proxy 400 can store information related to the end user's session for the duration of the session. A network element 114 can, for example, inform the proxy 400 about the end user's location or measurement data relating to the session. Another network element 114 can request for the session information or the session information may be needed to construct a reply to another network element's 114 query. If the only function that the proxy 400 performs is the protocol translation between network elements 114 and information stores 212, it is not mandatory that the proxy maintains session information for each session or for any session, for example, if memory is low. The more the proxy 400 caches, the better the performance of the system typically is.

As FIG. 4 shows, there may also be a management interface 430 in the proxy 400. In certain situations, it might be beneficial to know currently active sessions. Proxy's in-memory cache 420 can be queried for administrative purposes using the management interface 430. Due to some missed queries or malfunction in the network, some session data may be left in the in-memory cache 420 even if the session has been terminated. In such cases the management interface 430 can be used to purge orphaned session information.

The proxy 400 also has means for synchronizing service subscription information stored in said memory means with information stored in said plurality of information stores. It is possible that the synchronization is carried out by the proxy polling the information stores for changes, for example, periodically. Alternatively, the information stores may send updates relating to changed information, for example, periodically or as soon as the change takes place. When the proxy 400 notices a change in subscriber's subscription and the proxy 400 knows that the subscriber has an active session, the proxy 400 can push the updated subscription information to the network element 114 controlling the service usage. This requires support for unsolicited messages from the protocol that is being used to communicate between the proxy 400 and the network element 114.

Figure 5:
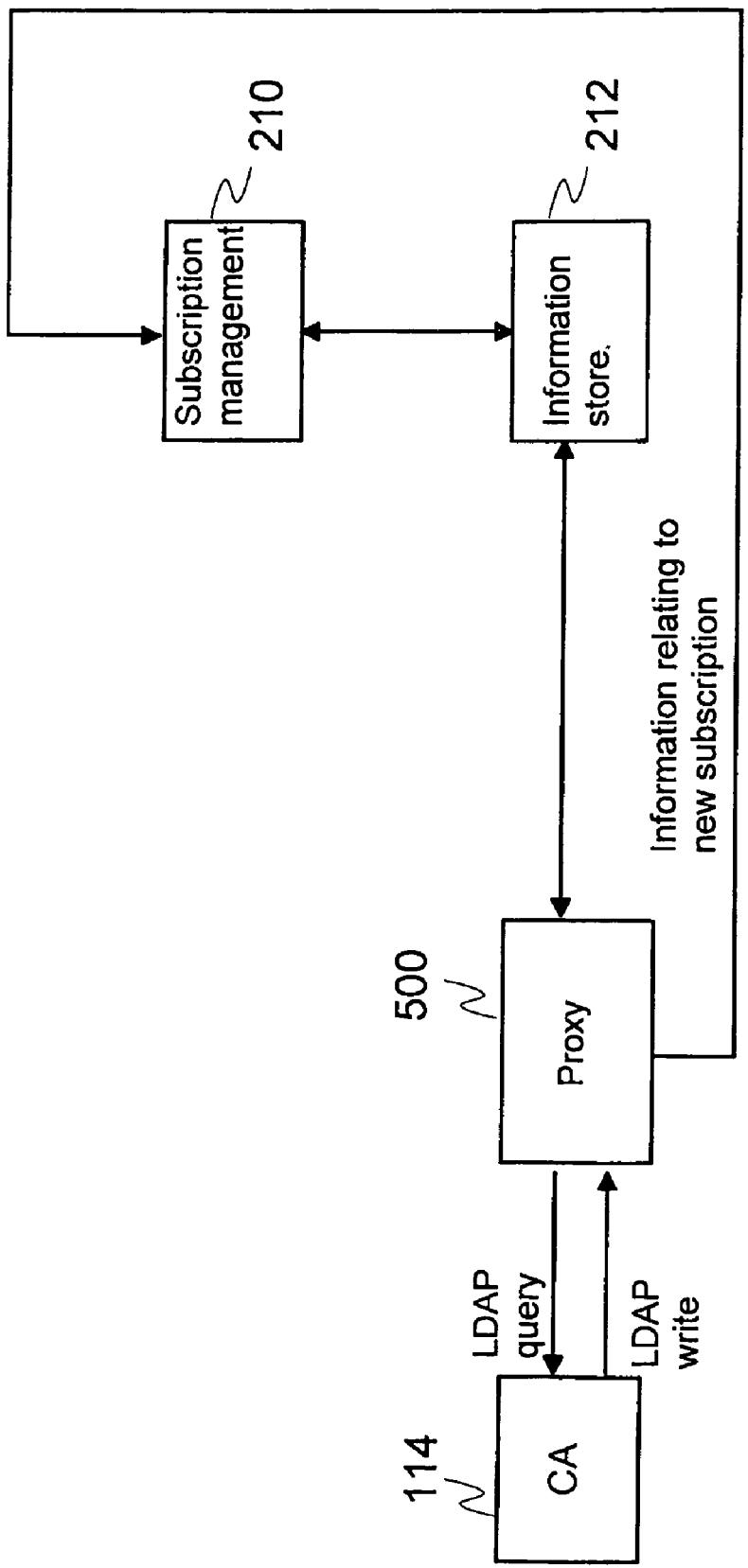
FIG. 5 shows schematically a proxy network element in accordance with a further embodiment of the invention in a communications system.

FIG. 5 shows schematically a proxy network element 500 in accordance with a further embodiment of the invention in a communications system. In FIG. 5, the network element 114 is configured to detect a need for a new service subscription. Typically the network element 114 first asks the proxy 500 for subscriber's subscription information for the service the subscriber is just about to access. If the subscriber has not subscribed for that service, the proxy 500 will inform the network element 114 that the subscriber doesn't have subscription for that service. In such case, the network element 114 can propose to the subscriber a new subscription. If the subscriber accepts the new subscription, the network element 114 will inform the proxy 500 about the new service subscription, thus confirming the new service subscription. Thereafter the proxy 500 sends to information relating to the new service subscription to the network element 210, which is responsible for managing service subscriptions. An alternative to proposing to the user a new subscription is to make the new subscription without confirmation. This means that in response to detecting a need for a new service subscription, the proxy network element 500 is configured to send information relating to the new service subscription to a network element 210 managing subscription information. The network element 210 then stores information relating to the new service subscription in the information store 212 shown in FIG. 5. It is possible that the network element 210 requests acceptance from the subscriber (user) for the service subscription. It is furthermore possible that the proxy network element 500 sends information about the new subscription to further network elements, in addition to the network element 210. For example, the proxy network element 500 may configure a network element so that access to the subscribed service is possible for the user. As a second example, the proxy network element 500 may inform a billing system about the new subscription.

Figure 6:
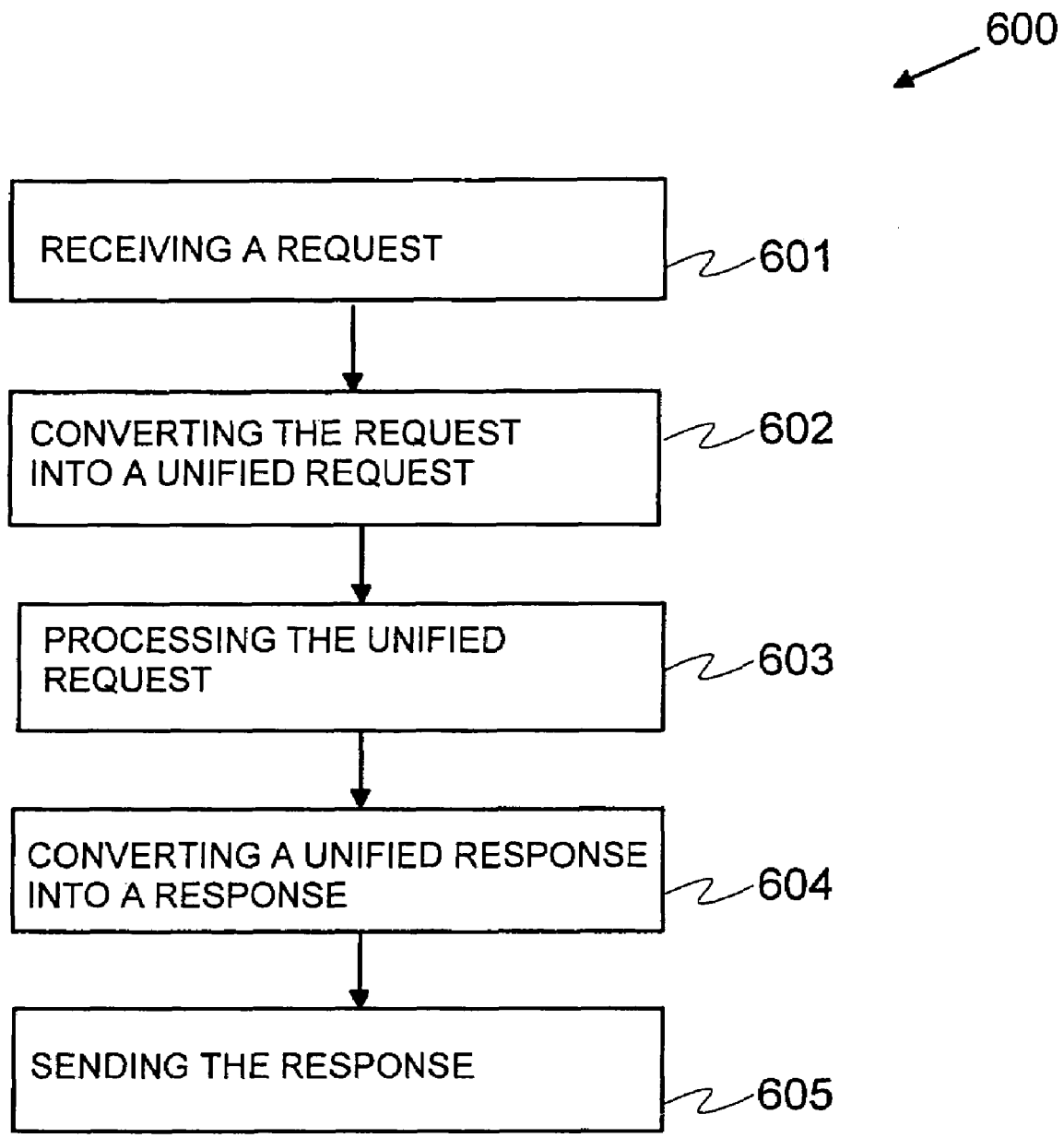
FIG. 6 shows a flowchart of a method in accordance with an embodiment of the invention.

FIG. 6 shows a flowchart of a method 600 in accordance with an embodiment of the invention. This method 600 is carried out in a proxy network element. In step 601 a request relating to service usage is received from a network element controlling service usage. The request is typically received using a protocol module compatible with the request. In step 602, the received request is converted into a unified request. In step 603, the unified request is processed. This processing typically results in a unified response. If a response is to be sent to the network element controlling service usage, the unified response is converted typically into a response in accordance with the same protocol than the request received in step 601. Should the response be sent to a further network element, the protocol of the response may be different from the protocol of the request. In step 605 the response is sent.

Figure 7:
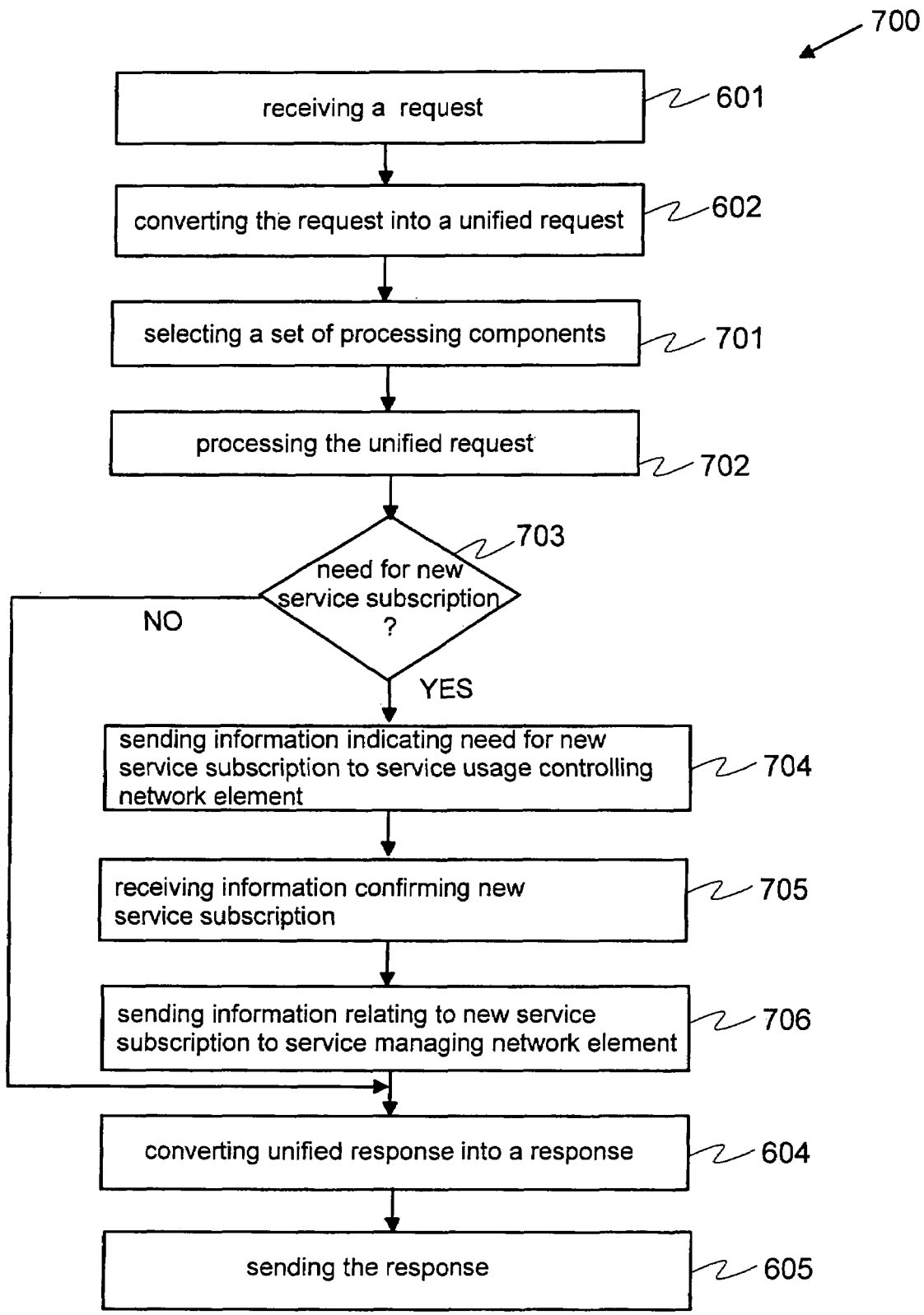
FIG. 7 shows a flowchart of a further method in accordance with an embodiment of the invention.

FIG. 7 shows a flowchart of a further method 700 in accordance with an embodiment of the invention. The method 700 starts with the same steps 601 and 602 as the method 600. Thereafter, in step 701, a set of processing modules is selected from a plurality of processing modules for processing the unified request in step 702. Should the proxy network element detect a need for a new service subscription in step 703, it may send information indicating the need for the new service subscription to the network element controlling service usage in step 704. The need for a new service subscription is typically detected when processing a unified request within the processing module pipeline. In step 705, the proxy network element may receive information confirming the new subscription from the network element controlling service usage. The messages sent between the proxy network element and the network element controlling service usage are typically processed using the protocol specific modules 311 and the processing modules 321. In response to receiving information confirming the new service subscription, the proxy network element sends information relating to the new service subscription to a network element managing services in step 706. In step 706, one of the data source connector modules 331 is typically employed. As discussed above, it is alternatively possible that the proxy network element proceeds from step 703 directly to step 706. In this case, the user accessing the service need not be aware that a subscription needed to be made. The method 700 continues with steps 604 and 605.

It is appreciated that the functionality of detecting a need for a new subscription and making the new subscription for the user may be implemented in various kinds of proxy network elements suitable for systems controlling service usage. Such a proxy element need not necessarily provide support for a plurality of protocols or information stores nor employ a unified message structure or processing modules.

It is possible that when processing a request relating to service usage, the proxy network element queries information from at least one information store. The proxy network element may further store information queried an information store. The proxy network element may further check, before querying information from an information store, whether said information to be queried is already stored within the proxy network element.

The proxy network element may further store session information relating to requests for further use.

The proxy network element may further receive information indicating a change in subscription information from an information store. The proxy network element may itself query for this information. The proxy network element may send information relating to said change in subscription information to at least one network element controlling service usage, especially when a service session relating to said change in subscription information is active.

It is appreciated that a service subscription relates to a subscriber. The user of the service may be the same entity as the subscriber or an entity relating to the subscriber.

It is furthermore appreciated that the terms user and subscriber in this specification cover both persons and processes subscribing to services and using services. The term user refers also to a process and a communications device used by a human user for accessing services.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claim is:

1. An apparatus, comprising:
   a processor configured to:
   communicate with a plurality of network elements using a plurality of protocols, said plurality of network elements controlling service usage based on service subscriptions;
   provide access for said plurality of network elements to a plurality of information stores of different types employing different protocols, said information stores storing information relating to said service subscriptions;
   receive requests from said plurality of network elements;
   convert said requests, having said plurality of protocols, into unified requests comprising unified messages having a predefined message structure with a predefined set of attributes or other predefined message components; and
   process said unified requests, to provide support to access said plurality of information stores of different types employing different protocols and to fetch information from at least one of said plurality of information stores.

2. The apparatus as defined in claim 1, wherein the processor is configured to execute a plurality of protocol specific modules, at least one of the protocol specific modules relating to a respective protocol of said plurality of protocols.

3. The apparatus as defined in claim 1, wherein the processor is configured to access a plurality of data source connector modules, at least one data source connector module relating to a respective information store of said plurality of different information stores.

4. The apparatus as defined in claim 1, wherein the apparatus is configured to process said unified requests to construct unified responses, comprising unified messages.

5. The apparatus as defined claim 4, further configured to convert a unified response into a response in accordance with a protocol of a respective request to be sent to at least one of said plurality of network elements.

6. The apparatus as defined in claim 4, wherein the processor is configured to execute a plurality of processing modules to process the unified messages.

7. The apparatus as defined in claim 6, wherein the processor is further configured to select a set of processing modules from the plurality of processing modules based on a unified message to be processed.

8. The apparatus as defined in claim 6, wherein the plurality of processing modules to process the unified messages comprises at least one of a message validation processing module, an attribute translation processing module, and a message filtering processing module.

9. The apparatus as defined in claim 6, wherein the plurality of processing modules comprises at least one processing module to query information from at least one of said plurality of information stores.

10. The apparatus as defined in claim 6, wherein the plurality of processing modules comprises at least one processing module to query information from an external information source.

11. The apparatus as defined in claim 6, wherein processing modules in said plurality of processing modules are loadable during operation of the apparatus.

12. The apparatus as defined in claim 6, wherein processing modules in said plurality of processing modules are configurable during operation of the apparatus.

13. The apparatus as defined in claim 4, wherein the processor is further configured to query information from said at least one information store selected from said plurality of different information stores based on a request to be processed.

14. The apparatus as defined in claim 13, wherein the processor is further configured to store information queried from at least one of said at least one information store.

15. The apparatus as defined in claim 13, wherein the processor is further configured to check, before querying information from an information store, whether said information to be queried is stored within the apparatus.

16. The apparatus as defined in claim 1, wherein the processor is further configured to receive information indicating a change in said subscription information from at least one of said plurality of information stores.

17. The apparatus as defined in claim 16, wherein the processor is further configured to query for said information indicating a change in said subscription information.

18. The apparatus as defined in claim 16, wherein the processor is further configured to send information relating to said change in said subscription information to at least one of said plurality of network elements controlling said service usage.

19. The apparatus as defined in claim 18, wherein the processor is further configured to send said information relating to said change in said subscription information when a service session relating to said change in said subscription information is active.

20. The apparatus as defined in claim 1, wherein the processor is further configured to store session information relating to requests for further use.

21. The apparatus as defined in claim 1, wherein the processor is further configured to detect a need for a new service subscription.

22. The apparatus as defined in claim 21, wherein the processor is further configured to send information relating to said new service subscription to a further network element responsible for subscription management.

23. A system, comprising:
a plurality of information stores of different types employing different protocols, comprising at least one information store configured to store information relating to service subscriptions;
a plurality of first network elements configured to control service usage based on said service subscriptions, said plurality of first network elements configured to use a plurality of protocols for communicating said information relating to the service subscriptions; and
a proxy network element configured to:
communicate with said plurality of first network elements using the plurality of protocols;
provide access for said plurality of first network elements to said plurality of information stores;
receive requests from said plurality of network elements;
convert said requests, having said plurality of protocols, into unified requests comprising unified messages having a predefined message structure; and
process said unified requests, to provide support to access said plurality of information stores of different types employing different protocols and to fetch information from at least one of said plurality of information stores.

24. A method, comprising:
receiving requests using a plurality of protocols, said requests relating to service usage and being received from a plurality of network elements responsible for controlling said service usage;
converting said requests, having said plurality of protocols, into unified requests comprising unified messages having a predefined message structure; and
processing said unified requests to provide support to access a plurality of information stores of different types employing different protocols and to fetch information from at least one of said plurality of information stores.

25. The method as defined in claim 24, further comprising:
using a data source connector module belonging to a plurality of data source connector modules provided in a proxy network element for accessing said plurality of different information stores.

26. The method as defined in claim 24, further comprising selecting a set of processing modules from a plurality of processing modules for processing said unified request.

27. The method as defined m claim 24, further comprising:
converting a unified response resulting from said processing into a response in accordance with said protocol.

28. An apparatus, comprising:
means for communicating with a plurality of network elements using a plurality of protocols, said plurality of network elements controlling service usage based on service subscriptions;
means for providing access for said plurality of network elements to a plurality of information stores of different types employing different protocols, said information stores storing information relating to said service subscriptions;
means for receiving requests from said plurality of network elements;
means for converting said requests, having said plurality of protocols, into unified requests comprising unified messages having a predefined message structure; and
means for processing said unified requests, to provide support to access said plurality of information stores of different types employing different protocols and to fetch information from at least one of said plurality of information stores.

* * * * *